Oct. 30, 1962 G. MANNHEIM 3,061,020
SEMI-MOUNTED FARM IMPLEMENT WITH AUTOMATICALLY
STEERED REAR WHEEL
Filed May 11, 1961 4 Sheets-Sheet 1
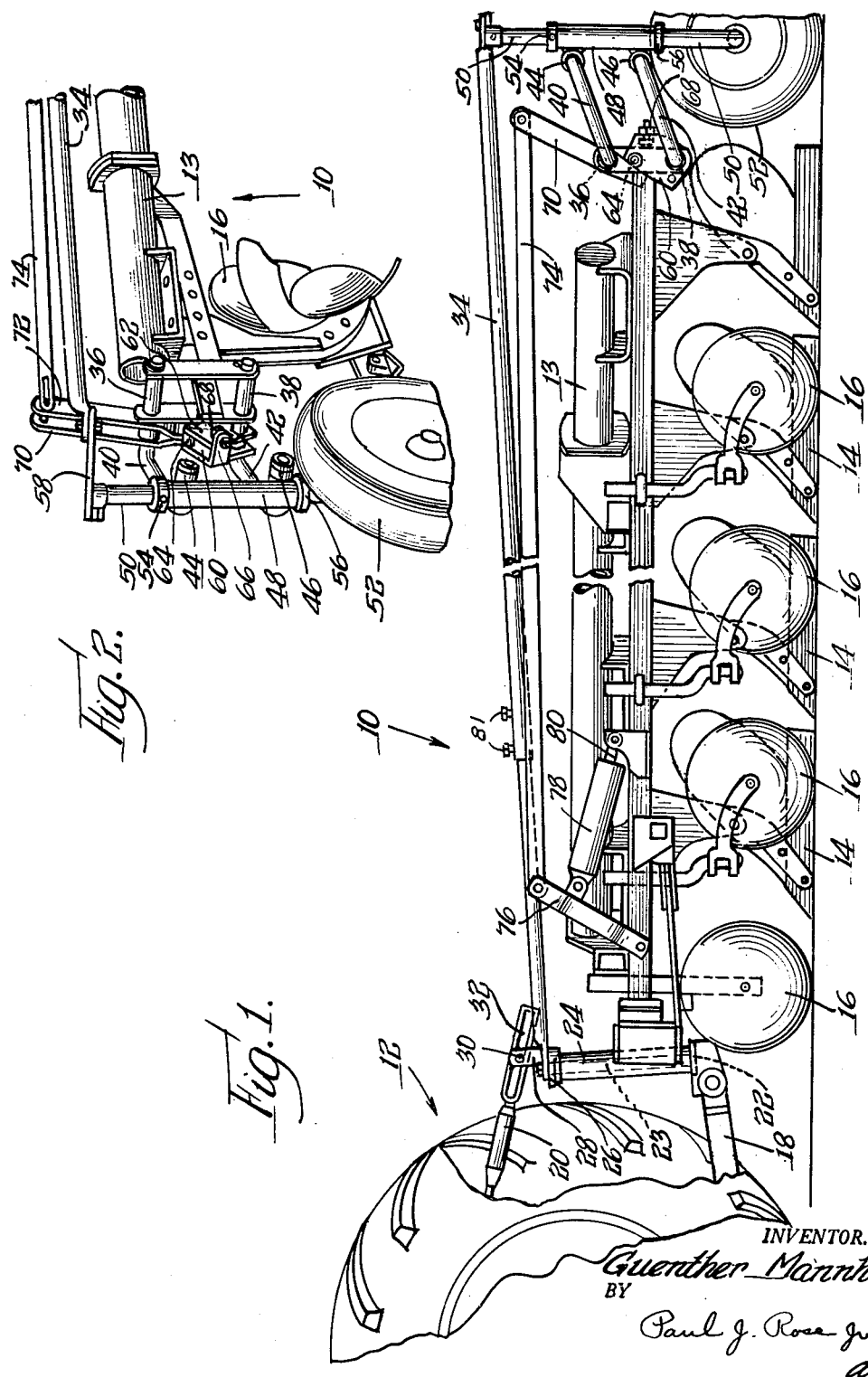
INVENTOR.
Guenther Mannheim
BY
Paul J. Rose Jr.
Atty.

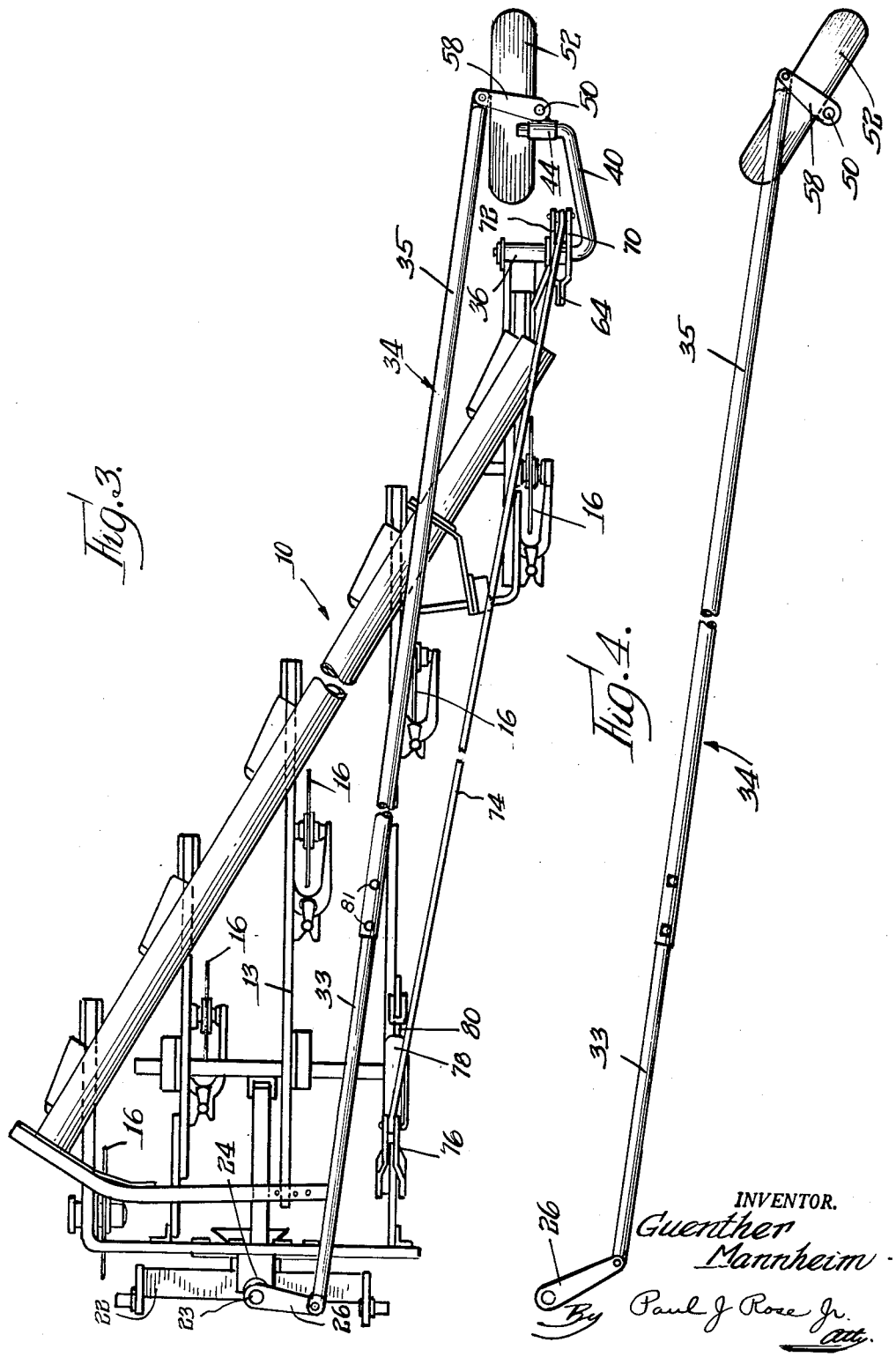

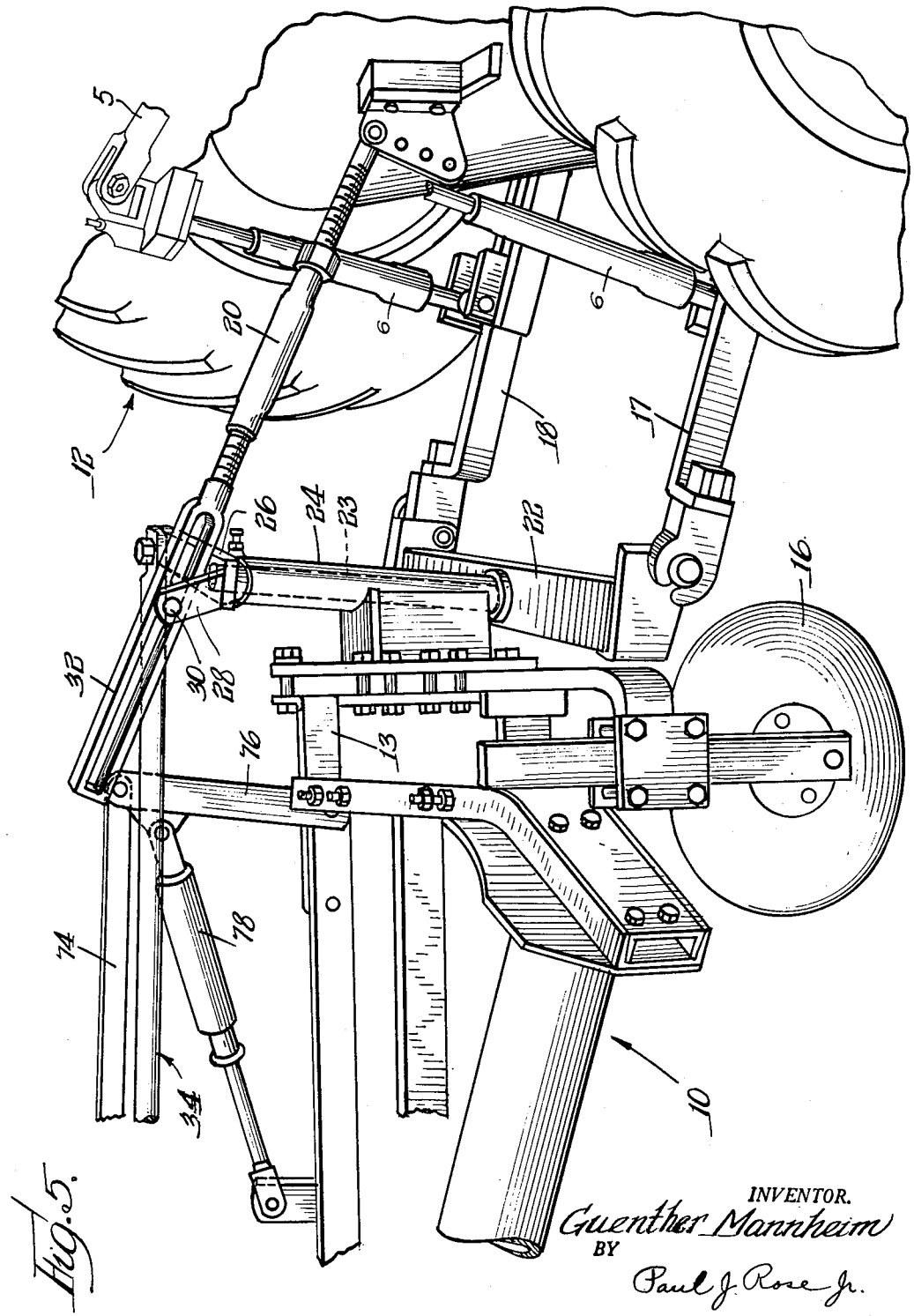

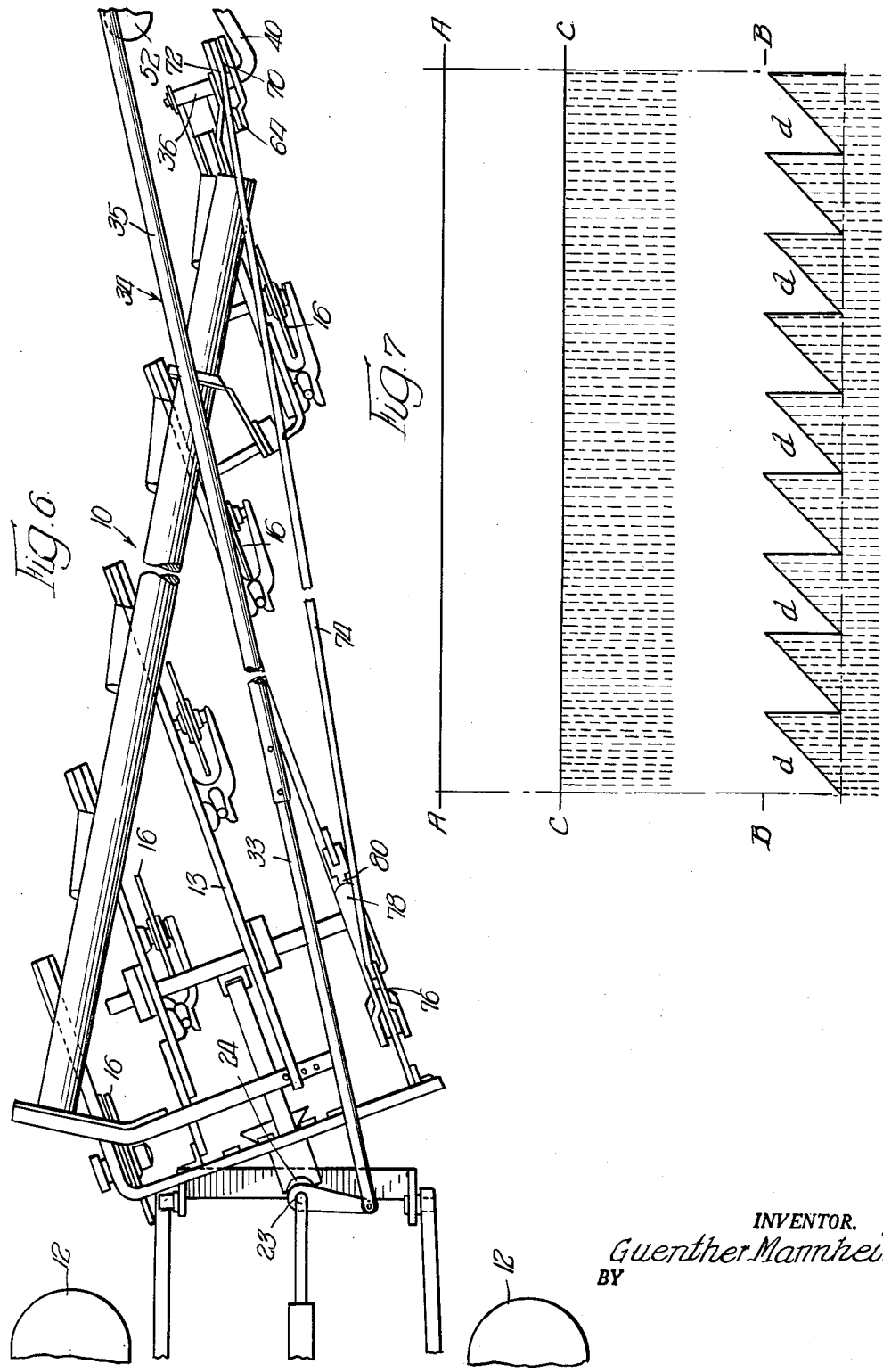

United States Patent Office 3,061,020
Patented Oct. 30, 1962

3,061,020
SEMI-MOUNTED FARM IMPLEMENT WITH AUTOMATICALLY STEERED REAR WHEEL
Guenther Mannheim, South Bend, Ind., assignor to Oliver Corporation, Chicago, Ill., a corporation of Delaware
Continuation of abandoned application Ser. No. 862,105, Dec. 28, 1959. This application May 11, 1961, Ser. No. 109,348
4 Claims. (Cl. 172—285)

This invention relates to certain innovations and improvements in semi-mounted farm implements, especially plows, including novel means for automatically steering the ground-engaging wheel at the rear of semi-mounted farm implements such as plows.

The invention has its greatest utility in connection with semi-mounted farm implements (e.g. plows) wherein the rear ground-engaging wheel is automatically steered and also may be raised and lowered relative to the implement frame, and wherein the front end of the implement is supported on rearwardly extending draft links of a tractor hitch which may be raised and lowered by power means on the tractor. By means of this novel combination of features and semi-mounted implement-tractor combination is fully articulated so that (1) turning can be accomplished on a minimum radius, (2) the implement will follow or "hug" the land or ground, and, (3) saw tooth unworked areas at the headlands are eliminated.

Heretofore, semi-mounted mold board type plows were attached to tractors with swinging drawbar links, so that in operation the plows could follow the tractor around slight curves. In the raised position of the plow, however, the drawbar links were not allowed to swing, and the tractor and plow became a laterally rigid unit. The caster wheel mounted at the rear end of the semi-mounted plow permitted the tractor and plow to turn when the plow was in raised position. Such semi-mounted units were subject to several shortcomings or disadvantages, and these became increasingly more serious with the trend toward larger tractors and longer semi-mounted implements (e.g. plows with a greater number of plow bottoms). One of the most important disadvantages or drawbacks was the relatively long or large turning radius of each semi-mounted implement-tractor combinations. This necessitated leaving relatively wide headlands at opposite ends of the fields being worked, which either had to be left unworked or which had to be worked in the opposite direction later on.

A further objection was that with an uncontrolled caster wheel mounted at the rear end of a long semi-plow unit (e.g. one with four or more plow bottoms) upon completion of a sharp turn at fast speed, the rear end of the plow will tend to move sideways, since the turning of the caster wheel lags the turning of the tractor, and this will result in "crack the whip" action which will impart a considerable shock to the tractor and the stabilizing means for the drawbars. This is not only hard on the equipment but it is also annoying to the tractor operator.

A further disadvantage with the prior semi-mounted units was due to the swinging motion of the drawbar links which permitted the semi-mounted plows or other implements to follow the tractor around slight curves. Upon usage of such units in traversing a hill from side to side a drifting or sideways movement was permitted. Several known expedients were resorted to in order to overcome this problem, taking the form of added devices requiring additional attention on the part of the operator and increasing the cost of the units.

The object of the present invention, generally stated, is the provision of semi-mounted farm implements or earth-working units, especially semi-mounted plows having four or more bottoms, wherein all of the foregoing disadvantages and drawbacks are overcome in a very practical, low cost manner.

An important object of the invention is the provision of a semi-mounted farm or earth-working implement, (e.g. semi-mounted plows) having at their front end a crossbeam member which is adapted to be connected to the rearwardly extending power-actuated draft links of a tractor hitch and having at the rear end of the implement or plow a steering support wheel with a steering mechanism being interconnected with the crossbeam member which is automatically steered by the tractor itself, thereby producing automatic steering of the rear support wheel at the same time.

A further object of the invention is the provision of semi-mounted farm or earth-working implement of the class described which has such width in use that it normally projects or extends laterally a substantial distance beyond the tractor on one side, but which may be readily adjusted for transport so that such projection is substantially eliminated or reduced while controlled steering is still fully obtained through the rear support wheel.

A further object of the invention is a semi-mounted farm implement or earth-working unit of the class described wherein the rear support wheel is automatically steered from a pivotal draft bar or crossbeam at the front end of the unit so that the crossbeam may be attached to the ends of the rearwardly, power-actuated, projecting links of a standard tractor hitch arranged so that they do not have any appreciable sidesway or side swing.

A further object of the invention is the provision of a semi-mounted farm implement of the class described wherein the headland width at the opposite ends of a field is reduced to a minimum by reason of the rear support wheel being automatically steered by the tractor in combination with the front end of the unit being independently raisable and lowerable through the draft links with the rear end being likewise independently raisable and lowerable through the rear support wheel linkage, whereby unplowed saw tooth areas are eliminated at the headlands while at the beginning and ending of each new row of furrows the plowing can be started or finished, respectively, while the unit is turning.

A further object of the invention is the provision of a semi-mounted farm implement or earth-working unit having a minimum or greatly reduced turning radius but with the rear support wheel automatically steered by the turning of the tractor whereby all "snap the whip" type action is eliminated.

Certain other objects of the invention will, in part, be obvious and will in part appear hereinafter.

For a more complete understanding of the nature and scope of the invention reference may now be had to the following detailed description thereof taken in connection with the accompanying drawings, wherein:

FIG. 1 is a view in side elevation illustrating the invention as applied to a semi-mounted moldboard type plow and partially showing a tractor with a standard or known type power-actuated hitch;

FIG. 2 is a fragmentary perspective view of the rear or trailing end of the semi-mounted plow;

FIG. 3 is a plan view of the semi-mounted plow of FIG. 1;

FIG. 4 is a plan view of part of the steering means for the rear wheel of the semi-mounted plow illustrating a different position thereof from that shown in FIG. 3;

FIG. 5 is a fragmentary perspective view of the front end of the semi-mounted plow and a portion of the rear of a tractor;

FIG. 6 is a view corresponding to FIG. 3 but showing the adjusted condition of the implement when it is to be transported and it is desired to have it trail behind the tractor without projecting beyond the left side thereof; and, FIG. 7 is a diagram of a field adjacent one headland end thereof in connection with which certain important advantages of the present invention will be described.

A semi-mounted plow is generally indicated by the numeral 10 and the rear of a tractor is generally indicated by the numeral 12. The semi-mounted plow 10 includes suitable framework 13 for supporting a plurality of plow bottoms 14 and disc coulters 16, the exact details of which form no part of the invention.

The tractor 12 is provided with a standard three-point hitch (e.g. category II, Three Point Free Link Attachment for Hitching Implements to Agricultural Wheel Tractors, approved March 1959, pages 74–76, Agricultural Engineers Handbook, 1960 Edition) including a pair of lower links 17 and 18 (FIG. 5) and an upper link 20 having an adjustable turnbuckle.

The draft links 17 and 18 (FIG. 5) may be raised and lowered in a well known manner by means of their associated rearwardly projecting power arms 5, only one of which is shown in FIG. 5. The outer ends of these power-actuated arms 5 are pivotally connected to the upper ends of links 6—6 which are adjustable in length so that the height of the links 17 and 18 may be readily adjusted. The power arms 5 are actuated by hydraulic means in a conventional, well-known, manner under control of the operator of the tractor.

The semi-mounted plow 10 is provided with a cross beam member 22 (FIG. 5) adapted to be pivotally connected in any suitable manner at its opposite ends to lower links 17 and 18 of the tractor 12. A post 23 is mounted on cross beam member 22 to extend substantially vertically upwardly therefrom. The front end of framework 13 is pivotally mounted on post 23 by means of a sleeve 24 rigidly secured to framework 13 in any suitable manner. Post 23 extends beyond the upper end of sleeve 24 to provide a mounting for a first steering arm 26 rigidly secured thereto. The inner end of arm 26 may be provided with a double vertically extending bracket 28 for mounting a pin 30 in a slotted free end 32 of upper link 20. In the event the tractor should start to overturn in a rearwardly direction the link 20 will limit the upward movement of the tractor when the inner end of the slot engages the pin 30. A steering link 34 is pivotally connected to the outer end of arm 26.

Secured to the rear of framework 13 is a mounting sleeve assembly including a pair of mounting sleeves 36 and 38 (FIG. 2) for mounting a pair of reversely bent parallel links 40 and 42 respectively. The opposite ends of links 40 and 42 from those mounted in sleeves 36 and 38 are mounted respectively in a pair of sleeves 44 and 46 secured transversely to a vertical sleeve 48. A steering shaft 50 having an axle at the lower end thereof for mounting a wheel 52 is mounted in sleeve 48, which is maintained in place axially of shaft 50 by a pair of upper and lower collars 54 and 56 secured to shaft 50. A second steering arm 58 is secured to the upper end of shaft 50 and pivotally connected at its outer end to steering link 34.

Small plates 60 and 62 (see FIG. 2) are welded to the leg of lower link 42 mounted in sleeve 38, and a pin 64 having a roller mounted thereon is mounted adjacent the radially outer extremities of plates 60 and 62. A bracket 66 is welded to plates 60 and 62 and provided with a bolt 68 which serves as a stop. A pair of arms 70, 72 is pivotally mounted on the leg of upper link 40. The arms 70 and 72 are spaced apart except at their lower ends, which are bent together to fit between plates 60 and 62 and engage the roller on pin 64. The upper ends of arms 70 and 72 are pivotally connected to a link 74 which is pivotally connected at its other end to an arm 76 (see FIG. 1) pivotally mounted on framework 13. The arm 76 is actuated by a hydraulic actuator including a cylinder 78 pivotally connected at one end to arm 76 and a piston rod 80 extending from the other end of cylinder 78 and pivotally connected to framework 13.

The lower links 17 and 18 of the tractor 12 can be raised and lowered by means of the power arms 5 as well understood in the art, to raise and lower the front end of framework 13 of semi-mounted plow 10. In FIG. 5, the front end of framework 13 is in the raised position, while in FIG. 1 the lowered position is shown.

The rear end of framework 13 is raised and lowered with respect to ground engaging wheel 52 by operation of the hydraulic actuator including cylinder 78 and piston rod 80. In FIGURE 1, the rear end of framework 13 is in the lowered position with respect to wheel 52. Links 40 and 42 are downwardly inclined from sleeve 48 in the lowered position of the rear end or framework 13. When the hydraulic actuator is operated to extend piston rod 80 from cylinder 78, arm 76 will be pivoted counter-clockwise in FIGURE 1, moving link 74 to the left and also pivoting arms 70 and 72 counter-clockwise in FIGURE 1. FIGURE 2 shows the rear end of framework 13 in the raised position with respect to wheel 52. FIGURE 2 is taken from the other side of FIGURE 1, so that in FIGURE 2 link 74 has been shifted to the right and arms 70 and 72 have been rotated clockwise. The lower ends of arms 70 and 72 have acted on the roller on pin 64 and pivoted plates 60 and 62 counter-clockwise in FIGURE 2 (clockwise in FIGURE 1). Links 40 and 42 have thus been rotated counter-clockwise in FIGURE 2, and since wheel 52 engages the ground, links 40 and 42 have pivoted about the ends thereof in sleeves 44 and 46, respectively, to raise the rear end of framework 13.

FIGURE 3 illustrates the position of the rear wheel of a semi-mounted plow and the steering means therefor when the tractor is moving straight ahead. When the tractor is making a left turn, the rear wheel of the semi-mounted plow and the steering means therefor may be in the position shown in FIGURE 4, for example. Note that the cross beam member 22 and steering arm 26 remain fixed with respect to the tractor, but because framework 13 pivots on post 23 with respect to arm 26, link 34 and arm 58 will be actuated to pivot wheel 52, as shown in FIGURE 4.

The steering of wheel 52 enables the tractor and plow to turn around in less room on headlands. The plow will follow the tractor smoothly around tight turns. Further, the wheel 52 can take side pressure in plowing.

For example, with the unit shown in drawings having six plow bottoms, when the tractor is turned as sharp or as tight as it can be turned in circling to the left the tail wheel 52 will swing and maintain the tail end of the semi-mounted plow inside the rear tractor wheel on the short left turns. In other words with the tractor circling to the left in the smallest turn circle it can make, the semi-mounted plow will lie and trail entirely within the outer right wheel track or tire mark. When the tractor is circled to the right the steerable tail wheel 54 will track only slightly outside of the outer rear wheel trail mark. Accordingly, with such a unit, the turning radius is for practical purposes the turning radius of the tractor itself.

Link 34 may be formed of two telescoping sections 33 and 35, which can be adjusted by loosening and tightening two set screws 81 to normally orient wheel 52 either slightly toward or slightly away from the furrow wall as ground conditions require.

It will be seen that a novel means of automatically steering the wheel at the rear of a semi-mounted farm implement has been provided, and that no more connections between the tractor and implement are required than previously when the wheel at the rear of the implement was not steerable.

Referring to FIG. 3 it will be noted that with the semi-mounted plow in the operating condition, that is, in condition for plowing, it extends laterally beyond the left hand end of the crossbeam 22 a substantial distance. This means that the steering trailing wheel 52 is also substantially to the left, or outside of the left rear wheel of the tractor. Accordingly, the entire unit (tractor and plow) has a width which substantially exceeds the maximum width of the tractor alone. This means that when the combined unit is towed down roads, the tractor must be kept over to the right just as far as possible to keep the semi-mounted plow from projecting too far into the middle of the road. Furthermore, when it is necessary to pull the unit through gateways or between buildings, or through doorways, this lateral protrusion of the rear end of the semi-mounted plow gives rise to considerable trouble. However, by simply loosening the set screws 81 the rear end of the semi-mounted unit may then be swung around to the position shown in FIG. 6 and then the set screws are tightened. In this condition the semi-mounted plow trails behind the tractor without projecting to either side thereof. It will now be able to clear many passageways that it could not have cleared before and there will be much less difficulty in traveling with the combined unit on highways.

It will be seen that the traction between the tractor 12 and the front end of the semi-mounted plow 10 is fully articulated in both the vertical and horizontal direction. That is, the tractor is free to turn to the right or left with respect to the trailing semi-mounted plow 10 on the one hand, and the tractor and plow unit are free to flex about the pivotal connection of the crossbeam 22 to the outer ends of the draft links 17 and 18 so that the tractor may dip down or start to rise relative to the plow unit. By reason of this full articulation the combined unit can travel across country or felds, traversing gullys and knolls but with the tractor maintaining full traction and contact with the ground both at the front and rear ends, while the semi-mounted plow also follows the contour of the ground independently of the tractor.

When the operator comes to the headland at one end of a field being plowed or otherwise worked, he will initially operate the control lever which serves to raise the lower links 17 and 18 so as to raise the front end of the plow above the ground, and at the proper interval he will operate the control lever which actuates the cylinder unit 78—80 so that the trailing end of the plow is also raised out of the ground. In the meantime, before the trailing or rear end of the plow is lifted out of the ground the operator can commence his turn in either direction without having to wait until the plow is completely elevated to the ground clearing position.

With a little experience operators quickly learn to carry out this sequence of operating the controls and turning the tractor so that the turn is completed in minimum time and without unduly slowing down the tractor.

Upon re-entering the plowed area the operator operates the control which allows the links 17 and 18 to lower and thereby cause the front end of the semi-mounted plow to drop down to the working level and enter the earth, following which at the proper interval the other control is operated which lowers the rear end of the semi-mounted plow unit by raising the wheel 52.

By reason of the fact that the front and rear ends of the semi-mounted implement or plow may be independently raised and lowered, while the ground supporting wheel at the end is automatically steered, it is possible to have the tractor start turning at the end of a row before the trailing end of the plow has completely come out of the ground. Accordingly, the steering of the rear wheel not only in itself permits a tighter or sharper turn but the raising and lowering of the implement allows this turning to start quicker, thereby even further minimizing the room required for turning around. The advantage of these turning characteristics can be brought out in connection with FIG. 7 of the drawings which indicates one end of a field being plowed. The line A—A indicates the boundry of the headland at this end of the field. If a plow is being used of the type which is semi-mounted on a trailing caster wheel, but with the entire plow being raised or lowered by operation of the hitch at the rear end of the tractor, it will be necessary to terminate the plowing at the line B—B and it will be noted that there are unplowed saw tooth type areas indicated at d—d. These occur where the multi-bottom plow enters and leaves the end of the plowing.

When the semi-mounted plow unit described in FIGS. 1–6 above is utilized it is possible to get up much closer to the headland boundary A—A and to also eliminate the unplowed saw tooth areas d—d. This new result is indicated by the line C—C. As explained above the fact that the forward and rear ends of the semi-mounted plow may be independently lifted and lowered eliminates the unplowed saw tooth areas, while the steerable rear wheel in combination with the selected raising and lowering of the front and rear ends of the unit permits the turning radius to be kept to a minimum.

This application is a continuation of my prior, co-pending application Serial No. 862,105, filed December 28, 1959.

It will be understood that certain obvious variations and modifications may be made without departing from the spirit and scope of the invention.

I claim:

1. In combination, a tractor having a pair of rearwardly extending draft links, a crossbeam extending horizontally between and rotatably mounted about a horizontal axis on said links whereby said crossbeam is fixed with respect to and moves with said tractor except as it is rotatable about said horizontal axis, a post rigid at its lower end with and extending upwardly from said crossbeam in a direction transversely of said horizontal axis, a first steering arm rigidly secured to and extending radially from the upper end of said post, a first sleeve journaled on said post below said first steering arm, a framework rigidly secured at its forward end to said first sleeve and extending generally rearwardly of said tractor and pivoted relatively thereto on said post, earth-working tool means depending from said framework, a second sleeve mounted on and extending upwardly at the rear end of said framework, a steering shaft journaled in said second sleeve, a ground-engaging wheel mounted for rotation about a horizontal axis on the lower end of and bodily rotatable with said steering shaft about its axis of rotation, a second steering arm rigidly secured to and extending radially from the upper end of said steering shaft, and a steering linkage interconnecting the distal ends of said first and second steering arms, said steering arms extending in such directions as to turn in opposite directions through said steering linkage whereby said tractor with said framework related thereto as aforesaid has relatively short turning characteristics.

2. For combination with a tractor having a pair of rearwardly extending draft links which may be raised and lowered by power means on the tractor, a semi-mounted earthworking implement comprising, a crossbeam adapted to be rotatably connected across the outer ends of said draft links and thereby rotatably mounted about a horizontal axis on said links whereby said crossbeam is fixed with respect to and moves with said tractor except as it is independently rotatable about said horizontal axis, a post rigid at its lower end with and extending upwardly from said crossbeam, a first steering arm rigidly secured to and extending radially from the upper end of said post, a first sleeve journaled on said post below said first steering arm, a framework secured at its forward end to said first sleeve and extending generally rearwardly of said tractor and pivoted relatively thereto on said post, earth-working tool means depending from said framework, a second sleeve mounted on and extending upwardly at the rear end of said framework, a steering shaft journaled in said second sleeve, a ground engaging wheel mounted for rotation about a horizontal axis on the lower end of and bodily rotatable with said steering shaft about its axis of rotation, a second steering arm rigidly secured to and extending radially from the upper end of said steering shaft, and steering linkage interconnecting the distal ends of said first and second steering arms, said steering arms extending in such directions as to turn in opposite directions through said steering linkage whereby a tractor with said implement connected thereto have relatively short turning characteristics, and said power means for raising and lowering said pair of links and thereby the front end of said framework independently of said ground engaging wheel serving to effect corresponding progressive change in the elevation of said earth working tool means from said front end to said rear end of said framework whereby said earth working tool means can finish out the area to be worked thereby.

3. For combination with a tractor having a pair of rearwardly extending draft links which may be raised and lowered by power means on the tractor, a semi-mounted earthworking implement comprising, a crossbeam adapted to be rotatably connected across the outer ends of said draft links and thereby rotatably mounted about a horizontal axis on said links whereby said crossbeam is fixed with respect to and moves with said tractor except as it is independently rotatable about said horizontal axis, a post rigid at its lower end with and extending upwardly from said crossbeam, a first steering arm rigidly secured to and extending radially from the upper end of said post, a first sleeve journaled on said post below said first steering arm, a framework secured at its forward end to said first sleeve and extending generally rearwardly of said tractor and pivoted relatively thereto on said post, earth-working tool means depending from said framework, a second sleeve mounted on and extending upwardly at the rear end of said framework, raisable and lowerable rear linkage means mounting said second sleeve on the rear end of said framework, a steering shaft journaled in said second sleeve, a ground engaging wheel mounted for rotation about a horizontal axis on the lower end of and bodily rotatable with said steering shaft about its axis of rotation, a second steering arm rigidly secured to and extending radially from the upper end of said steering shaft, a steering linkage interconnecting the distal ends of said first and second steering arms, said steering arms extending in such directions as to turn in opposite directions through said steering linkage whereby a tractor with said implement connected thereto have relatively short turning characteristics, separate power means mounted on said framework for independently actuating said raisable and lowerable rear linkage means so as to raise and lower said ground engaging wheel relative to said framework, and power transmitting means operatively interconnecting said separate power means with said rear linkage, said power means on the tractor raising and lowering said pair of draft links and thereby the front end of said framework independently of said ground engaging wheel and the rear end of said framework, and said separate power means serving to raise and lower said ground engaging wheel and thereby the rear end of said framework independently of the front end thereof.

4. In combination, a tractor having a pair of rearwardly extending draft links through which all of the pulling force of the tractor is transmitted, said tractor having hydraulic power means controllable from the tractor for raising and lowering said draft links, a semi-mounted earth-working implement having a front crossbeam rockably supported directly on and removably connected directly to the outer ends of said draft links, an implement frame, means for pivotally mounting said crossbeam at a point intermediate its opposite ends onto the front end of said frame whereby said crossbeam is pivoted in a generally horizontal plane about said mounting point with respect to said frame, a plurality of earthworking tools mounted on said frame, a rear ground-engaging steering wheel, means for mounting said wheel on the rear end of said frame whereby it can pivot with respect to a generally vertical axis whereby it is steerable and can also be raised and lowered with respect to the rear end of said frame, power transmitting means controllable from said tractor operably interconnecting said tractor power means and said rear steering wheel for raising and lowering the same, and steering linkage means operably interconnecting said crossbeam and said wheel whereby when said crossbeam pivots in one horizontal direction due to turning with said tractor said wheel pivots in the opposite direction, the front end of said implement being vertically adjustable from the tractor independently of the rear end thereof by raising and lowering of said draft links, the rear end of said implement being vertically adjustable from the tractor independently of the front end thereof by raising and lowering said steering wheel through operation of said power transmitting means.

References Cited in the file of this patent

UNITED STATES PATENTS

| | | |
|---|---|---|
| 2,322,342 | Bunn | June 22, 1943 |
| 2,682,822 | Toland et al. | July 6, 1954 |